S. P. BUSH.
METHOD OF MAKING CAR WHEELS.
APPLICATION FILED FEB. 28, 1913.
1,086,137.
Patented Feb. 3, 1914.
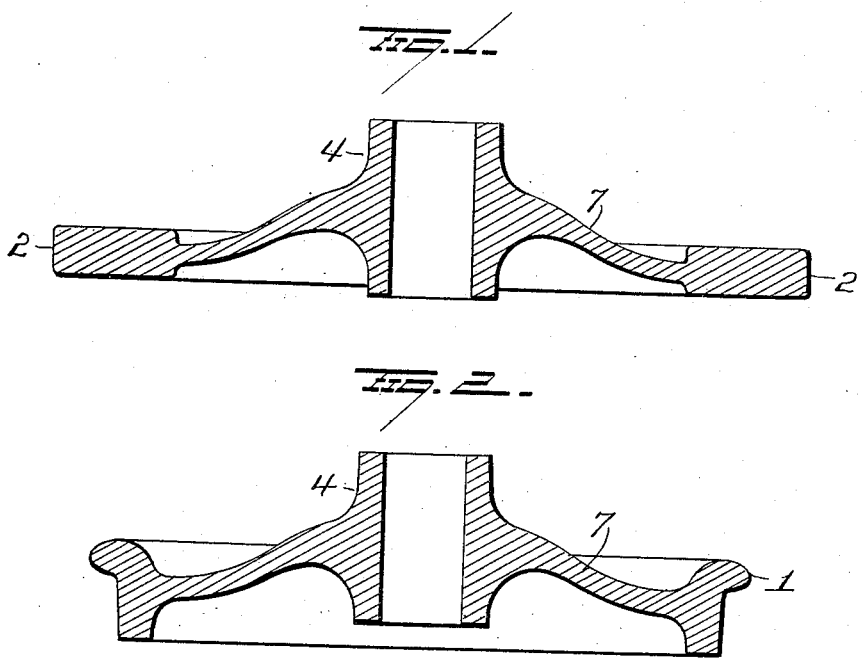

UNITED STATES PATENT OFFICE.

SAMUEL P. BUSH, OF COLUMBUS, OHIO, ASSIGNOR TO THE BUCKEYE STEEL CASTINGS COMPANY, OF COLUMBUS, OHIO, A CORPORATION.

METHOD OF MAKING CAR-WHEELS.

1,086,137.      Specification of Letters Patent.      Patented Feb. 3, 1914.

Application filed February 28, 1913. Serial No. 751,372.

*To all whom it may concern:*

Be it known that I, SAMUEL P. BUSH, of Columbus, in the county of Franklin and State of Ohio, have invented certain new and useful Improvements in Methods of Making Car-Wheels; and I do hereby declare the following to be a full, clear, and exact description of the invention, such as will enable others skilled in the art to which it appertains to make and use the same.

My invention relates to an improvement in the method of making car wheels having a rim portion made up of a metal of one kind chemically and physically, and a central or inner portion of another kind, the rim of the wheel being cast in blank form and subsequently shaped by rolling or pressing.

It is necessary in car wheels to have the rim portion which has to withstand heavy pressure, the heat from brake application, and abrasion, of hard tough and finely grained steel or iron alloy, and the central portion which must be machined at the hub for mounting on the axle, of softer and more malleable metal. It is also absolutely essential that the rim of the wheel shall be free from shrink holes and other imperfections which would tend to weaken the same.

The object of my invention is to provide a wheel blank having its periphery or rim portion made up of one kind of metal and a central or inner portion of another kind, and subsequently working and reshaping the rim of the blank to form the rim of the wheel, this reworking operating to condense and compact the rim into a solid homogeneous mass free from holes or other imperfections caused by shrinkage.

In the accompanying drawings Figure 1 is a view of my improved blank after casting but before working the rim to form the wheel rim, and Fig. 2 is a view of the wheel after the rim has been shaped.

In car wheels it is customary and essential to have the flange 1 of the rim within a plane passing through the hub 4 of the wheel, and the outer end of the hub in a plane intermediate the edges of the rim of the wheel as shown in Fig. 2.

In pouring the molten metal into the mold it is introduced at the center of the hub core and the first metal poured is of the character desired for the rim. This metal passes through slots in the lower end of the core and up into the hub, and from the latter down the web 7 into the rim blank 2. When the rim portion of the mold has been filled or substantially filled, the pouring is discontinued, and the metal adapted for the hub 4 and web 7 is poured without any material delay between the pouring steps. The metal last poured mixes to a certain extent with that in the hub portion of the wheel and tends to force that which is within the web 7 into the rim 2 so that, in the event the rim be not wholly filled at the first pouring, the metal last poured will force part of the metal in the web, into the rim thus wholly filling the latter. By this method of pouring the metals are kept reasonably distinct, hence the rim blank of the wheel is composed of metal best suited to sustain the wear and friction to which the rim is subjected, while the hub and web are composed of metal that may be readily machined.

Instead of pouring both metals through the hub, I may pour the metal for the rim blank directly at the rim, and that for the hub and web through the hub, the particular manner of introducing the two metals into the mold being unimportant.

The rim blank 2 is a comparatively thin section preferably of a section less than the finished wheel. It is well known that steel shrinks considerably in passing from a fluid to a solid state, and when the sections are heavy the interior metal remains fluid longer than the outer metal and the latter in solidifying will draw from the interior and thus leave voids or spaces commonly known as shrink holes. By making the rim blanks thicker and narrower than the finished wheel, the blank cools more evenly and there is naturally less shrinkage than in a larger section.

After the wheel has been thus formed the rim is worked preferably between rollers to reduce its thickness and increase its width and form the flange 1. This working of the rim blank not only operates to compress and compact the rim but it closes up any blow or other holes that may have formed in the rim blank.

Having fully described my invention what I claim as new and desire to secure by Letters-Patent, is:—

The method of making car wheels consisting in casting the rim blank of one metal, and the hub and web of another metal chemically and physically different from the metal of the rim blank, the two metals uniting while in a fluid condition, the rim blank being thicker and narrower than the cross section of the finished rim, and subsequently working the metal in the rim blank to form the rim and flange of the wheel.

In testimony whereof, I have signed this specification in the presence of two subscribing witnesses.

SAMUEL P. BUSH.

Witnesses:
  GEO. G. WERRING,
  W. E. PAGE.